United States Patent
Welch

(10) Patent No.: US 10,598,202 B2
(45) Date of Patent: Mar. 24, 2020

(54) INSERTABLE AND DETACHABLE DECK ANCHOR

(71) Applicant: Richard D Welch, Maple Valley, WA (US)

(72) Inventor: Richard D Welch, Maple Valley, WA (US)

(*) Notice: Subject to any disclaimer, the term of this patent is extended or adjusted under 35 U.S.C. 154(b) by 12 days.

(21) Appl. No.: 15/226,782

(22) Filed: Aug. 2, 2016

(65) Prior Publication Data

US 2017/0082241 A1  Mar. 23, 2017

(51) Int. Cl.
| | |
|---|---|
| *F16B 13/04* | (2006.01) |
| *F16B 21/02* | (2006.01) |
| *F16B 45/00* | (2006.01) |
| *E04H 15/04* | (2006.01) |

(52) U.S. Cl.
CPC ............ *F16B 13/045* (2013.01); *F16B 21/02* (2013.01); *E04H 15/04* (2013.01); *F16B 45/00* (2013.01)

(58) Field of Classification Search
USPC ........................................................ 248/509
See application file for complete search history.

(56) References Cited

U.S. PATENT DOCUMENTS

| | | |
|---|---|---|
| 457,397 A | 8/1891 | Church |
| 815,588 A | 8/1906 | Hile |
| 2,229,527 A | 1/1941 | Schouman |
| 2,265,629 A | 12/1941 | Christiansen |
| 2,622,543 A | 12/1952 | Rousseau |
| 2,688,289 A | 9/1954 | Sterling |

(Continued)

FOREIGN PATENT DOCUMENTS

BE    557722    3/1960

OTHER PUBLICATIONS

Jun. 8, 2016—Google Images Search; Tie-down anchor for deck and spring; http//www.discountramps.com/tie_down_rails/p/TRAK8/.

(Continued)

*Primary Examiner* — Monica E Millner
(74) *Attorney, Agent, or Firm* — R. Reams Goodloe, Jr.

(57) ABSTRACT

A tie-down anchor for securing an object to a plank deck structure having first and second members spaced apart by a gap. The tie-down anchor includes a shaft assembly and a spring assembly. The shaft assembly includes (a) a longitudinally extending rod, (b) an anchor portion located at a first end of the longitudinally extending rod, and (c) an attachment portion at a second end of the longitudinally extending rod. The anchor portion may include a bar portion sized and shaped for engaging a lower side of the first or second member, or both. The spring assembly includes a compression spring, an upper spring retainer, and a lower spring retainer. The spring assembly is adjustable along the longitudinally extending rod, between the anchor portion and the attachment portion. By engaging the lower spring retainer with the upper side of the first member or the second member, or both, and compressing the compression spring, the bar portion of the anchor portion is pushed below the plank deck structure. Then, the shaft assembly is rotated and subsequently released. Upon installation, the tie-down anchor securely engages the plank deck, by and between the bar portion and the lower spring retainer.

24 Claims, 5 Drawing Sheets

(56) References Cited

U.S. PATENT DOCUMENTS

| | | | | |
|---|---|---|---|---|
| 2,729,418 | A * | 1/1956 | Maynard | B64C 1/20 248/502 |
| 2,755,120 | A * | 7/1956 | Young | E05C 19/028 292/163 |
| 3,102,708 | A * | 9/1963 | Crain | B60P 7/0807 224/403 |
| 3,381,925 | A * | 5/1968 | Higuchi | B60P 7/0807 410/116 |
| 3,597,808 | A * | 8/1971 | Johnson | F16G 11/101 114/218 |
| 3,718,325 | A | 2/1973 | Nystrom | |
| 4,008,669 | A * | 2/1977 | Sumrell | B60P 7/12 105/422 |
| 4,297,963 | A * | 11/1981 | Beacom | E02B 3/24 114/218 |
| 4,315,651 | A | 2/1982 | Endicott, Jr. et al. | |
| 4,354,445 | A * | 10/1982 | Kafka | B63C 3/06 114/218 |
| 4,630,982 | A * | 12/1986 | Fenner | B61D 45/001 24/265 CD |
| D321,470 | S | 11/1991 | Gerrard | |
| 5,098,057 | A | 3/1992 | Gran | |
| 5,444,897 | A * | 8/1995 | Gross | B60P 7/0807 24/115 K |
| D363,616 | S | 10/1995 | Allen | |
| 5,542,367 | A | 8/1996 | Dubois, III et al. | |
| 5,662,304 | A | 9/1997 | McDaniel | |
| 5,733,082 | A | 3/1998 | Schrader | |
| 5,967,075 | A * | 10/1999 | Johansen | A47B 23/02 114/218 |
| D436,383 | S | 1/2001 | Chesler | |
| 6,647,911 | B1 | 11/2003 | Solterbeck | |
| 6,793,198 | B2 | 9/2004 | McKay | |
| D530,188 | S | 10/2006 | Kalat | |
| 7,575,215 | B1 * | 8/2009 | Clark | A01K 97/10 248/222.11 |
| D614,021 | S | 4/2010 | Lecours | |
| 7,827,729 | B2 | 11/2010 | Barnes | |
| D668,941 | S | 10/2012 | Taurins | |
| D669,345 | S | 10/2012 | Taurins | |
| 8,327,575 | B1 * | 12/2012 | Zalewski | 248/519 |
| 8,561,330 | B2 | 10/2013 | Siegenthaler et al. | |
| D715,134 | S | 10/2014 | Wells | |
| D733,545 | S * | 7/2015 | Charette | D8/387 |
| D735,563 | S | 8/2015 | Kelley | |
| 9,127,698 | B1 | 9/2015 | Brull et al. | |
| D752,414 | S | 3/2016 | Brooks | |
| 9,390,155 | B2 | 7/2016 | Otala et al. | |
| 2005/0246997 | A1 | 11/2005 | Bishop | |
| 2007/0292229 | A1 | 12/2007 | Andrew et al. | |
| 2012/0047412 | A1 | 2/2012 | Chung | |
| 2013/0001395 | A1 * | 1/2013 | Schmalzried | F24J 2/525 248/506 |
| 2015/0047197 | A1 | 2/2015 | Deloubes | |
| 2017/0082241 | A1 | 3/2017 | Welch | |

OTHER PUBLICATIONS

Jun. 8, 2016—Google Images Search; Tie-down anchor for deck and spring; https://www.amazon.com/Deck-Down-950430-Discountinued-Manufacturer/dp/B00Q8IZR5Q?ie=UTF8&*Version*=1&*entries*=0.

Jun. 8, 2016—Google Images Search; Tie-down anchor for deck and spring; http://www.marshallshardware.com/products/product.aspx?pid=2-561-1039-19781.

* cited by examiner

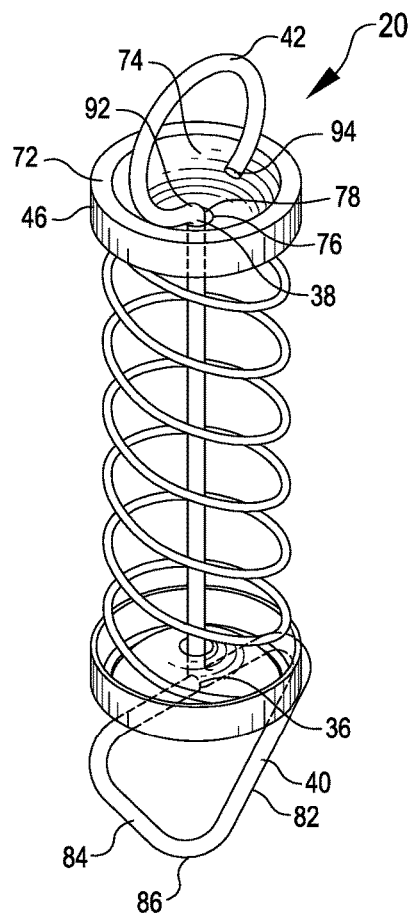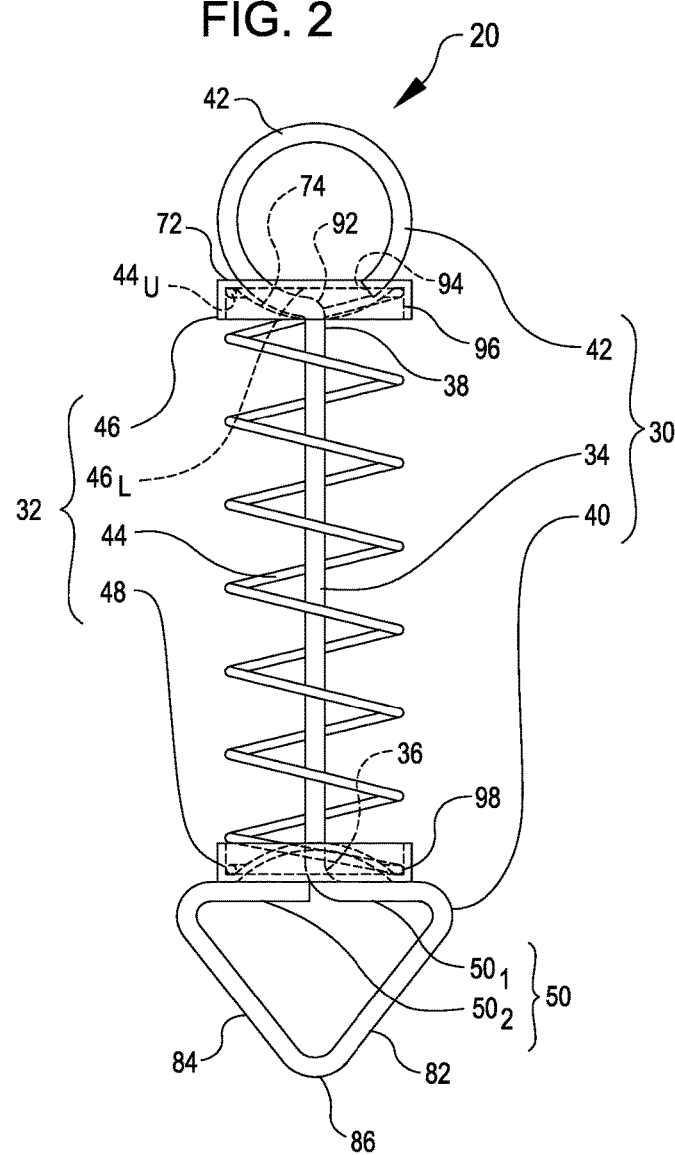

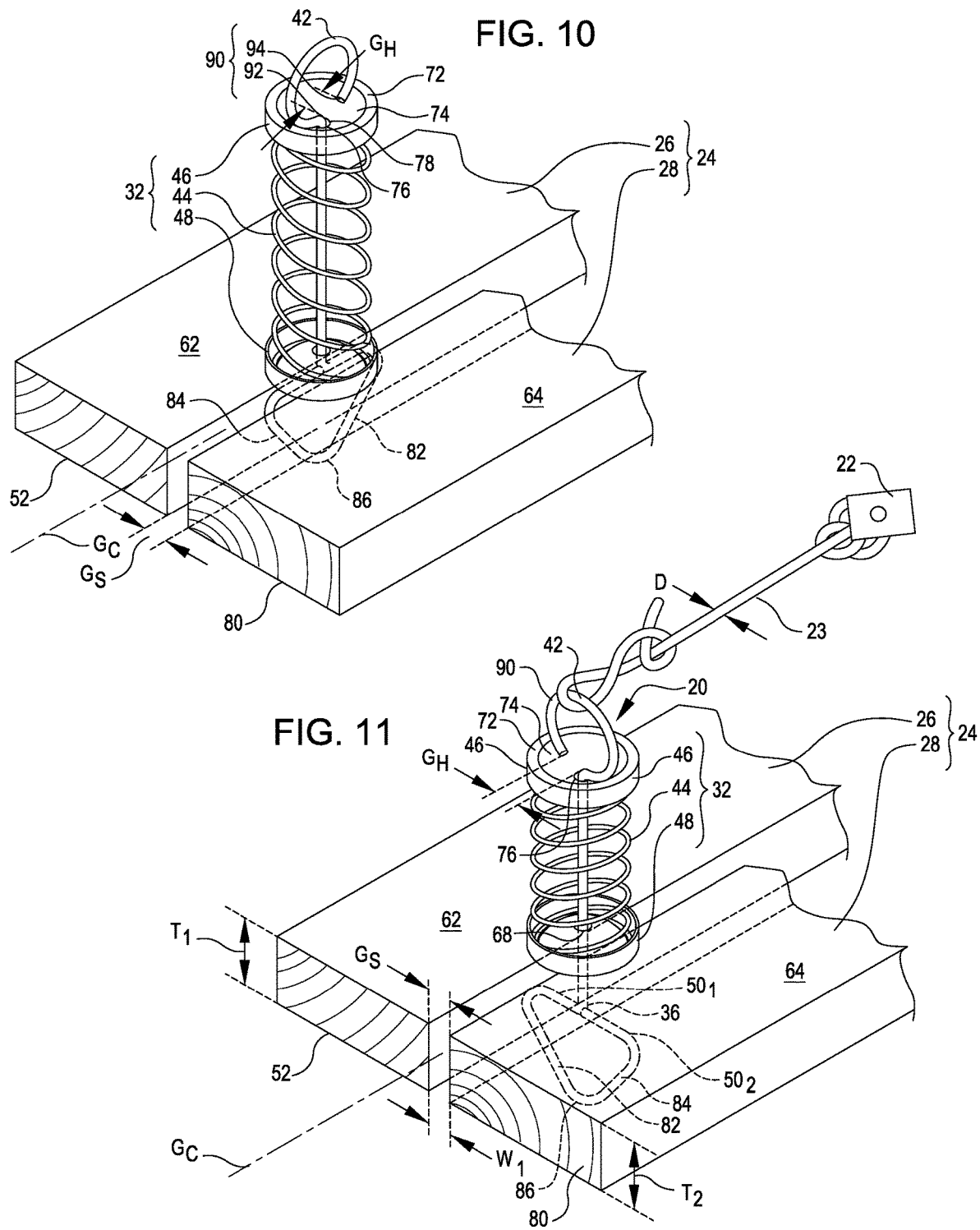

INSERTABLE AND DETACHABLE DECK ANCHOR

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

None.

TECHNICAL FIELD

This disclosure relates to tie-down anchors for use in planked decks or the like, and in particular, to portable tie-down anchors.

BACKGROUND OF THE INVENTION

Back yard wooden decks, or other plank type decks, often are used to store or display various items, such as chairs, tables, cooking equipment, plants, or other items that might be desirable to secure when such items are not in use. Most decks are not built with tie-down anchors thereon, and installation of permanent tie-down anchors may be inconvenient—such as causing trip hazards—or may be aesthetically undesirable. Even if permanent tie-down anchors are made available, they may not be conveniently located, or may not be easily accessible or may not otherwise be available for securing objects to the deck.

And, while on occasion decks may be provided with tie-down points, many such designs may not be specifically designed to easily and securely receive a rope, line, or eyebolt, carabiner, or other tie-down or fastening device that may be useful in securing objects to the deck. Moreover, permanent tie-down anchors may not be desirable, as, for example, they may be in the way of foot traffic during seasonal use of a planked deck. In any event, permanently installed tie-down anchors may not be easily removed for use elsewhere. Thus, in the event that a tie-down anchor is needed at a different spot on the planked deck, or at another location, an additional tie-down anchor must be obtained.

Accordingly, it would be desirable if an easily installable and easily removable tie-down anchor device were available for use on planked decks. It would be even more desirable if such a device were available that provided a safe and adequate securing point, and which can be conveniently attached, yet easily removed for use elsewhere, and which avoids tripping hazards or unsightly appearance.

Thus, there remains a continuing unmet need for a portable and easily installable and removable tie-down anchor for a plank deck, and in which tie down ropes, snaps, bungee cords, or other devices can be easily and conveniently attached to a deck.

BRIEF DESCRIPTION OF THE INVENTION

A tie-down anchor for securing an object to a plank deck structure is provided. Such plank deck structures may have adjacent first and second members of thickness $T_1$ and $T_2$, respectively, which are spaced apart by a gap of width $W_1$. Basic components of the tie-down anchor include a shaft and a spring assembly. The shaft includes (a) a longitudinally extending rod having a first end and a second end, (b) an anchor portion located at the first end of the longitudinally extending rod, and an attachment portion at the second end of the longitudinally extending rod. The anchor portion may include a bar portion sized and shaped for engaging a lower side of the first or second member, or both. The first end of the longitudinally extending rod and the anchor portion each having a maximum width suitable for fitting through the gap of width $W_1$.

The spring assembly may include (a) a compression spring, (b) an upper spring retainer, and (c) a lower spring retainer. The upper spring retainer may have a first inner edge defining a first shaft receiving aperture, for adjustably receiving a portion of the shaft therethrough. The lower spring retainer may have a second inner edge defining a second shaft receiving aperture, for adjustably receiving a portion of the shaft therethrough. The spring assembly is longitudinally adjustable along the axis of the shaft, and is located around the longitudinally extending rod, and adjustably located between the anchor portion and the attachment portion. The lower spring retainer includes a bottom surface suitable for engaging an upper side of the first member or the second member, or both.

In use, by engaging the lower spring retainer with the upper side of the first member or the second member, or both, and compressing the compression spring, the bar portion of the anchor portion may be pushed below the first member or second member, or both. Then, the shaft (a) may be rotated, for example, by ninety degrees (90°) and then (b) released, so as to release pressure on the compression spring, so that the tie-down anchor is placed in an installed configuration. In such installed configuration, the tie-down anchor securely engages at least the first member or at least the second member, or both, by and between (1) the bar portion at the lower side of the first or second members, or both, and (2) the lower spring retainer at the upper side of the first or second members, or both.

To secure the tie-down anchor to a plank deck, the bar portion at the anchor portion is first aligned with a gap between two deck planks. The anchor portion is then inserted through the gap sufficiently so it may then be axially rotated so as to allow the bar portions of the anchor portion to engage the lower side of the first member or second member, or both. In an embodiment of the method, the bar portions may be rotated until the bar portions are substantially perpendicular to the gap between the deck planks. Thereafter, pressure on the compression spring may be released.

Once the first member or second member, or both, are securely sandwiched between the anchor portion and the lower side of the lower spring retainer, an attachment device, such as a rope or bungee cord, may be secured to the tie-down anchor. The method of the installation process may be easily reversed for removal of the attachment device, and easy removal of the tie-down anchor from the plank deck.

BRIEF DESCRIPTION OF THE DRAWING

The present invention(s) will be described by way of exemplary embodiments, using for illustration the accompanying drawing in which like reference numerals denote like elements in the various figures of the drawing, and in which:

FIG. 1 is a perspective view of a tie-down anchor, showing the shaft portion with longitudinal rod portion, anchor portion, and attachment portion, as well as the spring assembly, including a compression spring, and an upper spring retainer, and a lower spring retainer, and revealing the dished heads of the upper spring retainer and of the lower spring retainer.

FIG. 2 is partially cut away side view of a tie-down anchor, showing the shaft portion with longitudinal rod portion, anchor portion, and attachment portion, and revealing the use of a hook portion having a distal end to provide a hook gap for passage therethrough of an fastening device such as a rope (not shown), as well as the spring assembly, including a compression spring, and an upper spring retainer in cross-section, and a lower spring retainer in cross-section, and revealing in broken lines the shape of the dished heads of the upper spring retainer and of the lower spring retainer.

FIG. 6 is side view of a tie-down anchor in position for placement at a selected location at a gap between a first member and a second member of a plank deck, showing the anchor portion aligned so that it fits through the gap between the first and second member of a plank deck.

FIG. 7 is a side view of a tie-down anchor first shown in FIG. 6 above, which has now been inserted into position at a selected location in a gap between a first member and a second member of a plank deck, wherein the compression spring has been urged downward to position the anchor portion below the lower side of the first and second members of a plank deck, and with the anchor portion aligned so that it has been inserted through the gap between the first and second member of a plank deck, and is ready for rotation.

FIG. 8 is a side view of a tie-down anchor as illustrated in FIGS. 6 and 7 above, but which has now been completely installed into a working position at a selected location in a gap between a first member and a second member of a plank deck, and wherein the anchor portion has been rotated ninety degrees (90°) and the compression spring released, so that the bar portions on the anchor portion now engage the lower side of the first and second members of a plank deck, while the lower spring retainer engages the upper side of the first and second members of the plank deck.

FIG. 9 is a side view of a tie-down anchor as illustrated in FIGS. 6, 7, and 8 above, but in which the upper spring retainer has been depressed downward in the direction of the reference arrow in order to expose the hook gap on the hook shaped attachment portion, showing that when the upper spring retainer has been moved downward along the longitudinally extending rod portion of the shaft, the hook gap is exposed, unlike in FIG. 8, where the hook gap is caged by the upper concave surface of the upper spring retainer.

FIG. 10 is a perspective view of a tie-down anchor in the position as shown above, as the anchor portion appears in a stage between that shown in FIG. 6 and that shown in FIG. 7, wherein the anchor portion has been inserted into position at a selected location in a gap between a first member and a second member of a plank deck, but before the compression spring has been urged downward to position the anchor portion below the lower side of the first and second members of a plank deck.

FIG. 11 is perspective view illustrating a tie-down anchor as illustrated in FIG. 8 above, but which has now been completely installed into a working position at a selected location in a gap between a first member and a second member of a plank deck, and wherein the anchor portion has been rotated ninety degrees (90°) and the compression spring released, so that the bar portions on the anchor portion now engage the lower side of the first and second members of a plank deck, while the lower spring retainer engages the upper side of the first and second members of a plank deck, and where the hook gap is caged by the upper concave surface of the upper spring retainer.

Figure 3:
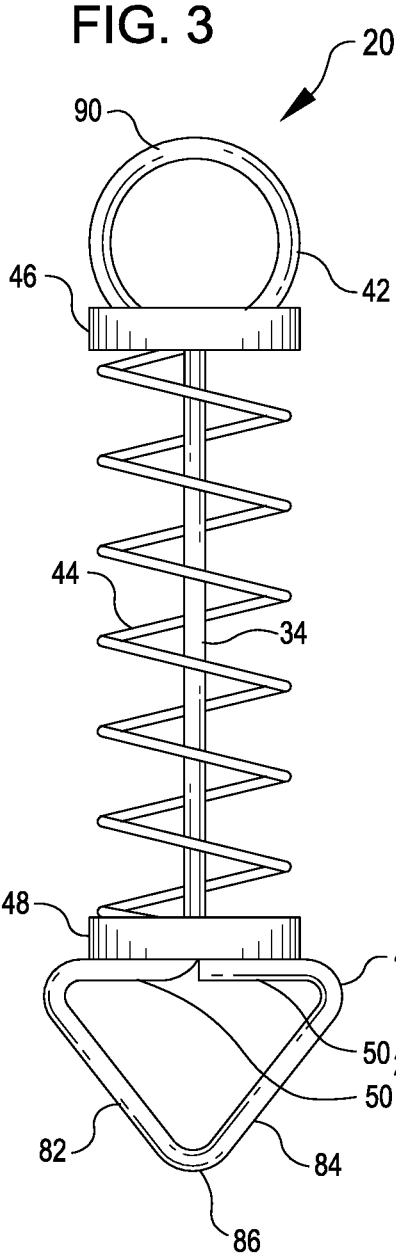
FIG. 3 is a side view of a tie-down anchor as just revealed in FIG. 2, now providing an external view, showing the shaft portion with longitudinal rod portion, anchor portion, and attachment portion, as well as the spring assembly, including a compression spring, and an upper spring retainer, and a lower spring retainer.

The foregoing figures, being merely exemplary, contain various elements that may be present or omitted from a final configuration for an embodiment of a portable tie-down anchor for use with a plank deck having a gap between first and second members, or that may be implemented in various embodiments described herein for a tie-down anchor device. Other variations in tie-down anchors may use other mechanical structures, mechanical arrangements, or size and shape of components, and yet employ the principles described herein and as generally depicted in the drawing figures provided, and as more specifically called out in the claims set forth below. In particular, although specific dimensions have not been provided, sufficient detail is provided so that those of skill in the art will be easily able to make and use the claimed invention. Thus, a tie-down anchor device may be provided which is sized up or down from any relative configurations provided, without affecting the scope of the appended claims. An attempt has been made to draw the figures in a way that illustrates at least those elements that are significant for an understanding of exemplary tie-down anchor devices which may be used in various applications.

It should be understood that various features may be utilized in accord with the teachings hereof, as may be useful in different embodiments as useful for various sizes and shapes of tie-down anchors depending upon specific requirements (such as thickness of various members of a plank deck, the materials of constructions) selected for a particular application, within the scope and coverage of the teachings herein as defined by the claims. Further, like features in various embodiments for tie-down anchors may be

DETAILED DESCRIPTION

Attention is directed to FIG. 11, where an exemplary embodiment for a tie-down anchor 20 for use in securing an object 22 (using a fastening element 23, such as a cord, string, or rope) to a structure 24 such as a plank deck, where the structure 24 includes adjacent first 26 and second 28 members. In various applications, the adjacent first 26 and second 28 members may be provided having a thickness $T_1$ and $T_2$, respectively. In various applications, the first 26 and second 28 members may be spaced apart by a gap $G_s$ of width $W_1$. In various applications, the plank deck members, including first 26 and second 28 members, may be provided in the form of wood or wood substitute decking members.

As seen in FIG. 11, and also in FIGS. 1 and 2, the tie-down anchor 20 may include two primary components, namely a shaft assembly 30, and a spring assembly 32. The shaft assembly 30 may include (a) a longitudinally extending rod 34 having a first end 36 and a second end 38, (b) an anchor portion 40 located at the first end 36, and (c) an attachment portion 42 located at the second end 38. The spring assembly 32 may include (a) a compression spring 44, (b) an upper spring retainer 46, and (c) a lower spring retainer 48.

In an embodiment, the shaft assembly 30 may be provided as a unitary, one-piece component wherein the anchor portion 40 and the attachment portion 42 are manufactured by bending the end portions of a length of suitable raw material, such as a steel or stainless steel rod. In an embodiment, such a rod may be provided in the form of a cylindrical rod.

In an embodiment the anchor portion 40 may have a bar portion 50 sized and shaped for engaging a lower side 52 of at least the first member 26 of the structure 24. In an embodiment, the bar portion 50 of anchor portion 40 may include a first bar portion segment $50_1$ and a second bar portion segment $50_2$. In various embodiments, the first end 36 of the longitudinally extending rod 34 and the anchor portion 40 may each have a maximum width $W_{40}$ (at least along the axis of bar portion 50, or along the axis of first bar portion segment $50_1$ and second bar portion segment $50_2$) of less than or about equal to width $W_1$ of gap $G_s$.

Figure 12:
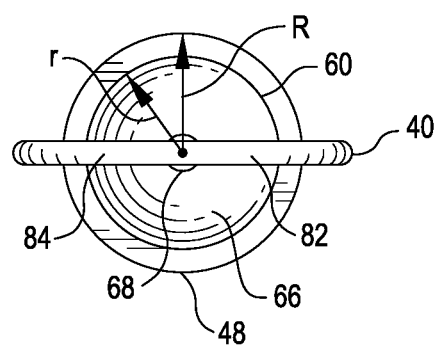
FIG. 12 is a bottom side view of a tie-down anchor as revealed in FIG. 3 above, now providing a view of an embodiment for the lower spring retainer and anchor portion, as seen looking up from the bottom of the tie-down anchor, showing the anchor portion.

The spring assembly 32 may include an upper spring retainer 46 that has a first inner edge 76 defining a first shaft receiving aperture 78. The spring assembly 32 may include a lower spring retainer 48 that has a second inner edge 68 and defines a second shaft receiving aperture 70. As seen in FIG. 12, the lower spring retainer 48 includes a bottom surface 60 sized and shaped for engaging an upper side 62 of at least the first member 26 of structure 24. In an embodiment, lower spring retainer 48 includes a bottom surface 60 which is sized and shaped for engaging the upper side 64 of the second member 28, either independently or in addition to engagement with the first member 26 of structure 24. In various embodiments, the bottom surface 60 of lower spring retainer 48 may be provided configured in the shape of a ring or annulus having an outer radius (R) and an inner radius (r). Inward from the inner radius (r) of the annulus, an upwardly extending inwardly dished head 66 may be provided in the lower spring retainer 48. The lower spring retainer 48 may have a second inner edge 68 defining a second shaft receiving aperture 70, for adjustably receiving a portion of the shaft assembly 30 therethrough. As seen in FIG. 1, the upper spring retainer 46 may be similarly fabricated, and thus include a top surface 72 configured in the shape of a ring or annulus, and a downwardly extending inwardly dished head 74 may be provided. The upper spring retainer 46 may have a first inner edge 76 defining a first shaft receiving aperture 78, for adjustably receiving a portion of the shaft assembly 30 therethrough. In this manner, the elements of the spring assembly 32 are each longitudinally adjustable along at least a portion of the shaft assembly 30, and more particularly, upwardly or downwardly along the longitudinally extending rod 34.

Figure 7:
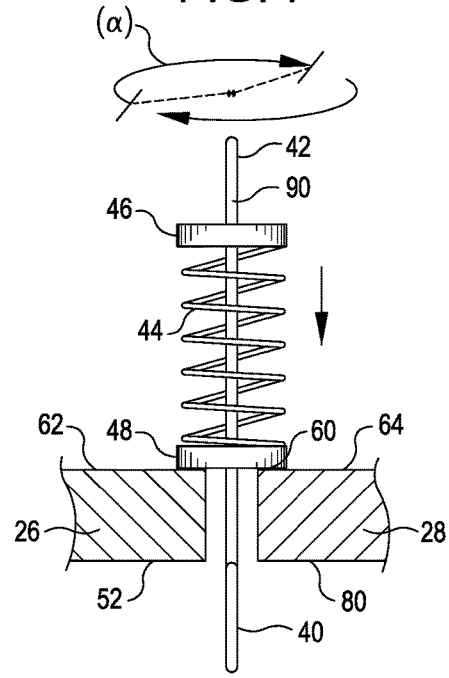

As can be appreciated by reference to FIG. 10, to install the tie-down anchor 20, the tie-down anchor 20 is first positioned over the gap $G_s$ between first member 26 and second member 28, and the anchor portion 40 is aligned with the centerline $G_c$ of the gap. Then, as can be appreciated by reference to FIGS. 6, 7, 8, and 9, the bottom surface 60 of the lower spring retainer 48 is engaged with the upper side 62 of at least the first member 26, while the anchor portion 40 is substantially aligned with the longitudinal axis $G_c$ of the gap $G_s$ between the first member 26 and second member 28 of the structure 24. Then, the compression spring 44 is compressed between the upper spring retainer 46 and the lower spring retainer 48, by urging the shaft assembly 30 downward pressure thereon, and in an embodiment, by using downward pressure on the attachment portion 42, until the bar portion 50 of the anchor portion 40 is positioned below the lower side 52 of the first member 26 and the lower side 80 of the second member 28 of structure 24. Then, the shaft assembly 30 is rotated sufficiently that the bar portion 50 of the anchor portion 40 engages the lower side 52 of first member 26 or lower side 80 of second member 28, or both, when the compression spring 44 is released. As noted in FIG. 7, in various embodiments of a method for installation of tie-down anchor 20, the shaft assembly may be rotated an angle alpha (α) of from at least about twenty degrees (20°) to about forty five degrees (45°), or from about forty five degrees (45°) to about ninety degrees (90°), or approximately ninety degrees (90°). It should be recognized that the tie-down anchor 20 is installed by hand and that exact rotation measurements are unnecessary for adequate installation, so deviations from the above numbers at least in the range of from about ten degrees (10°) to about fifteen (15°) degrees should be expected in practice. In any event, in an installed configuration, the tie-down anchor 20 securely engages at least the first member 26, by and between the bar portion 50 at the lower side 52 of the first member 26, and the bottom side of the lower spring retainer at the upper side 62 of the first member 26.

Figure 5:
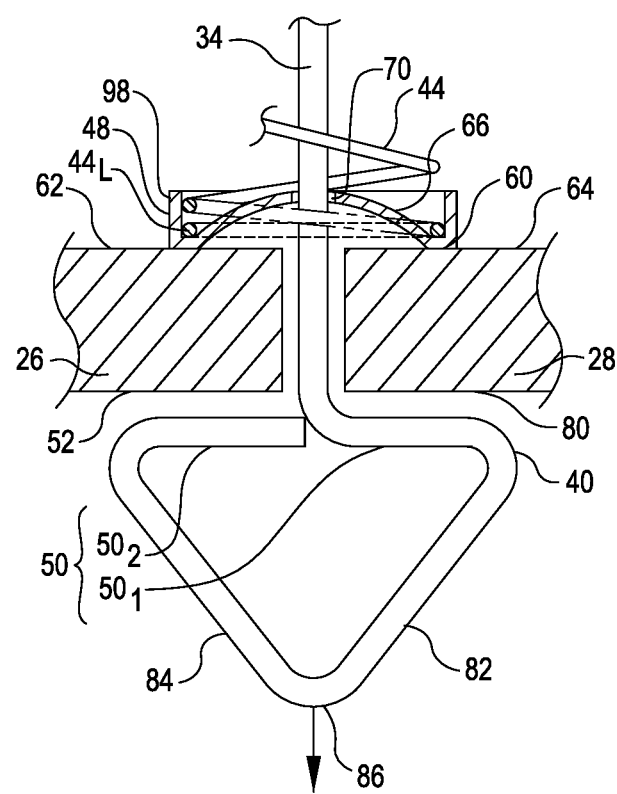
FIG. 5 is an enlarged view of a portion of the tie-down anchor as just revealed in FIG. 2 above, and as further explained in FIG. 4, now showing such portions of the tie-down anchor being installed through a gap in between first and second members of a plank deck, and further revealing some of the shaft portion including the first end of the longitudinal rod portion, and the anchor portion, as well as a portion of the spring assembly, including a portion of the compression spring, and the lower spring retainer in cross-section, and revealing in broken lines the shape of the dished head of the lower spring retainer.
Figure 6:
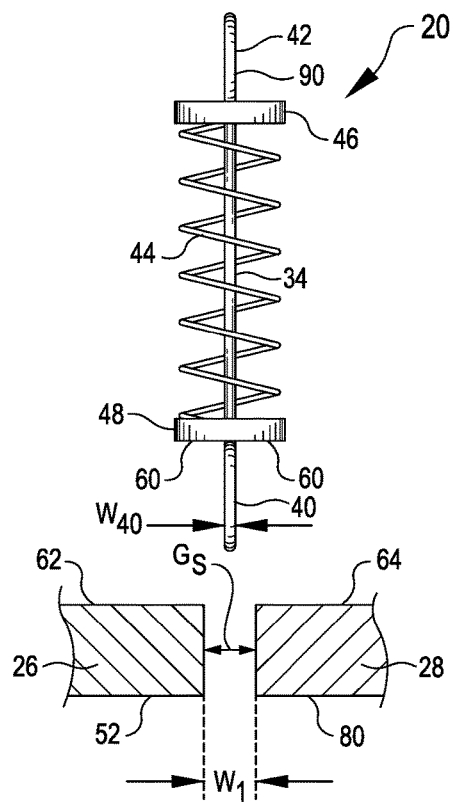
FIGS. 6, 7, 8, and 9 illustrate the sequence of installation of a tie-down anchor as may be used on a plank type deck.
Figure 9:
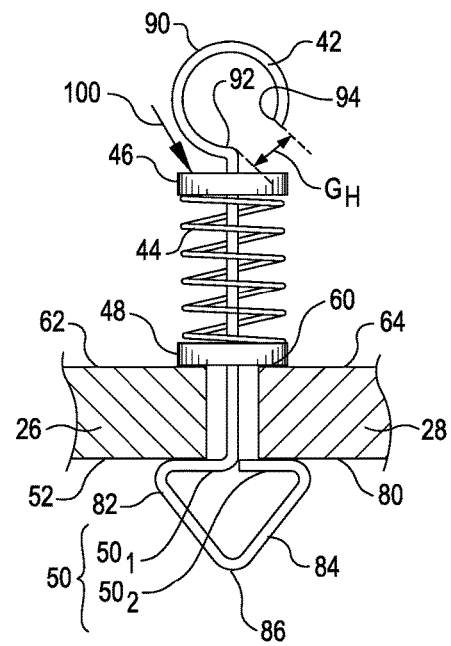

As can be seen in FIGS. 5 and 9, in an embodiment, the bar portion 50 may include at least a first bar portion segment $50_1$ that is oriented radially in at least one direction, at least in part, with respect to the longitudinally extending rod 34. In an embodiment, the bar portion 50 may include a first bar portion segment $50_1$ and a second bar portion segment $50_2$ each of which is oriented radially with respect to the longitudinally extending rod 34. Further, as seen in FIG. 5, the bar portion 50 may include a first bar portion segment $50_1$ and a second bar portion segment $50_2$, either or both of which are oriented perpendicular to the longitudinally extending rod 34.

Figure 4:
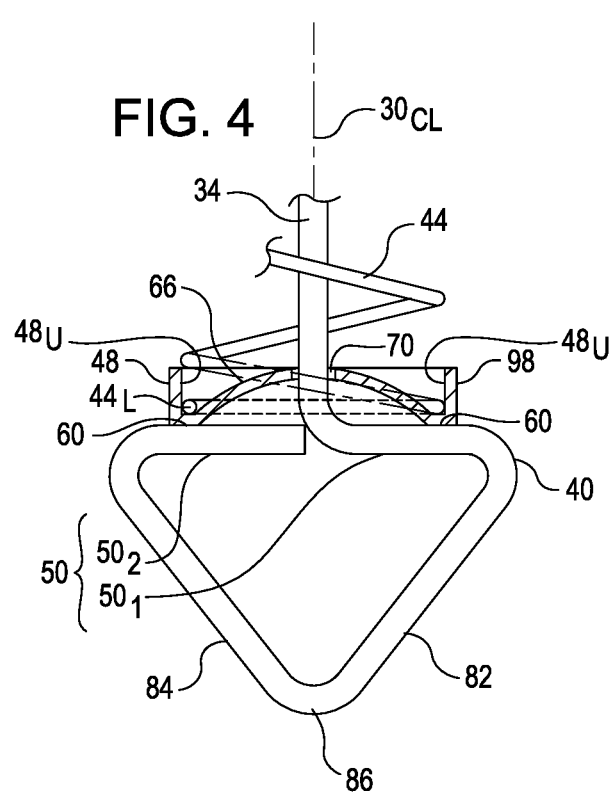
FIG. 4 is an enlarged view of a portion of the tie-down anchor just revealed in FIG. 2 above, showing some of the shaft portion including the first end of the longitudinal rod portion, and the anchor portion, as well as a portion of the spring assembly, including a portion of the compression spring, and the lower spring retainer in cross-section.

As seen in various figures, but particularly in FIGS. 4 and 5, the anchor portion 40 may further include downwardly oriented first 82 and second 84 segments, at least one of which extends from the bar portion 50. In an embodiment, the first downwardly oriented segment 82 and second downwardly oriented segment 84 may be integrally formed with bar portion 50. In an embodiment, the first downwardly oriented segment 82 and second downwardly oriented segment 84 may be joined at a vertex 86 to provide, together with the bar portion 50, a downwardly oriented triangularly shaped anchor portion 40. The downwardly oriented triangularly shaped anchor portion 40 may thus be well adapted for penetrating the gap $G_S$ between the first member 26 and the second member 28. The just described configuration for the anchor portion 40 may be especially helpful in cases, where, such as in backyard wooden decks, such gaps $G_S$ become traps for, and may clog with, various type of debris.

As seen in FIGS. 9, 10, and 11, the tie-down anchor 20 may be provided with an attachment portion 42 which is in the form of a hook shaped portion 90 having a hook base 92 and a hook distal end 94. In an embodiment, a tie-down anchor 20 may be provided with a hook gap of width $G_H$ between the hook distal end 94 and the hook base 92. In such embodiments, the hook gap of width $G_H$ is adapted to accept therethrough a fastening element 23 (see FIG. 11) having an outside dimension D (or diameter in case of cylindrical fastening elements 23) less than or equal to width $G_H$ of the hook gap between hook distal end 94 and hook base 92.

Figure 8:
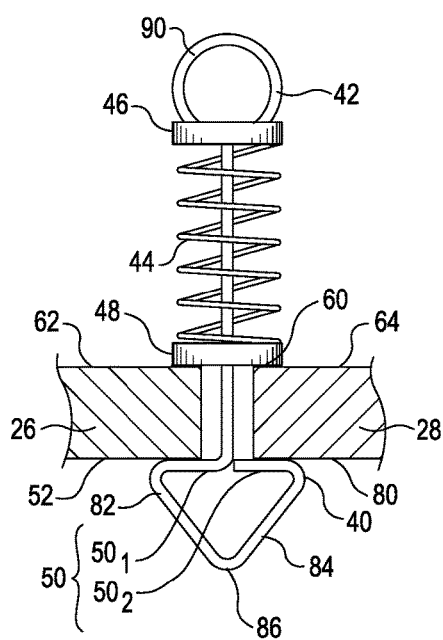

As may be seen by comparison of FIGS. 1 and 2, or 8 and 9, in an embodiment, the upper spring retainer 46 further comprises a lower or spring capture side $46_L$ and an upper or hook capture side $46_U$. In an embodiment, the hook capture side $46_U$ may provide the downwardly extending inwardly dished head 74 in a shaped which closely approximates the curvature of hook 90, so that the downwardly extending inwardly dished head 74 is sized and shaped to close the hook gap $G_H$ between the hook distal end 94 and the hook base 92, when the tie-down 20 is in an installed configuration, as illustrated in FIGS. 8 and 11.

As seen in FIG. 2, for ease in capturing the compression spring 44, the upper spring retainer 46 may include a spring capture side $46_L$ that further includes an annular lip 96 sized and shaped to capture an upper end $44u$ of the compression spring 44.

In FIGS. 4 and 5, it can be seen that in an embodiment, mirror image structural components may be provided for the lower spring retainer 48. In such embodiments, the tie-down anchor 20 is provided with a lower spring retainer 48 that has an inwardly dished head 66. The lower spring retainer 48 may have a spring capture side $48_U$, and the compression spring may have a lower end $44_L$. The spring capture side $48_U$ may further include an annular lip 98 sized and shaped to capture the lower end $44_L$ of the compression spring 44.

In various embodiments, for example as seen in FIGS. 1 and 11, the longitudinally extending rod 34 may have, at least in part, a cylindrically shaped outer surface. In an embodiment, the longitudinally extending rod 34 may be provided as cylindrical solid. Similarly, the bar portion 50, and more specifically, first bar portion segment $50_1$ and second bar portion segment $50_2$ may have, at least in part, a cylindrically shaped outer surface.

As earlier noted, in order to install the tie-down anchor 20 in a structure 24 such as a plank deck with a gap between first 26 and second 28 members, the shaft assembly 30 must be rotatably adjustable with respect to the spring assembly 32. Also, in order to install the tie-down anchor 20 in a structure 24 such as a plank deck with a gap between first 26 and second 28 members, the shaft assembly 30 must be axially adjustable—that is up and down—with respect to the spring assembly 32.

A method is provided herein for anchoring an object 22 to structure 24 such as a plank deck having at least two planks including a first member 26 and second member 28 and a gap $G_S$ therebetween. In an embodiment of the method each of the planks in the plank deck, i.e. the first member 26 the second member 28 may each have an upper side 62 and 64, respectively, and a lower side 52 and 80, respectively. First a tie-down anchor 20 as described above is provided. The tie-down anchor 20 is placed in juxtaposition with the plank deck structure 24 so that the anchor portion 40 aligns with the centerline $G_C$ of the gap between two deck planks, namely the first member 26 and the second member 28. The anchor portion 40 is inserted into the gap, and at least some of the longitudinally extending rod 34 extends into the gap between the two deck planks (that is, between first member 26 and second member 28) until the bar portion 50 (and where present, first bar portion segment $50_1$ and second bar portion segment $50_2$) extend below the lower side 52 of first member 26 and lower side 80 of second member 28. The shaft assembly 30 is rotated about its longitudinal axis (see centerline $30_{CL}$ in FIG. 4) until at least one of the bar portion 50 (and where present, first bar portion segment $50_1$ and second bar portion segment $50_2$) is oriented from about forty five degrees (45°) to about ninety degrees (90°) relative to the centerline $G_C$ of the gap $G_S$. Finally, the tie-down anchor 20 is released axially (allowing upward movement of the shaft assembly 30) while keeping the tie-down anchor 20 in place laterally, so that the deck plank first member 26 and second member 28 are firmly secured between the bar portion 50 and the bottom surface 60 of the lower spring retainer 48.

In an embodiment, the method just described may further include providing an attachment portion 42 which includes a hook shaped portion 90 having a hook base 92 and a hook distal end 94, wherein a hook gap of width $G_H$ is provided between the hook distal end 94 and the hook base 92. Then, the upper spring retainer 46 is urged against the compression spring 44 as indicated by reference arrow 100, and the both are urged toward the lower spring retainer 48, in order to space the hook distal end 94 away from the upper spring retainer 46, to expose the hook gap $G_H$. Then, a portion of a fastening element 23 may be inserted through the hook gap $G_H$, provided the fastening element 23 has an outside dimension D (diameter if a cylindrical fastening element 23 such as a rope is provided) less than or equal to width of hook gap $G_H$. Finally, the upper spring retainer 46 is released, so that the upper spring retainer 46 closes the hook gap $G_E$, so as to securely retain the fastening element 23 in the attachment portion 42. In various embodiments, it is to be appreciated that the tie-down anchor 20 is sized and shaped for manual installation and removal to and from the plank deck structure 24 without the use of tools.

It is to be appreciated that the tie-down anchor system as disclosed herein is an appreciable improvement in the art of tie-down anchors for use in plank deck structures or the like. The novel design provided for a tie-down anchor addresses the problem of how to provide for seasonal or temporary attachment of objects to a plank deck structure. The embodiments have been thoroughly described to enable those of ordinary skill in the art to make and use the invention, and the devices may include embodiments which utilize materials appropriate for the service, such as steel, stainless steel, high grade aluminum, or other treated materials suitable for corrosion resistance during years of outdoor use.

Although only a few exemplary embodiments have been described in detail, various details are sufficiently set forth in the drawings and in the specification provided herein to enable one of ordinary skill in the art to make and use the invention(s), which need not be further described by additional writing in this detailed description.

The aspects and embodiments described and claimed herein may be modified from those shown without materially departing from the novel teachings and advantages provided by this invention, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A tie-down anchor for securing an object to a structure, the structure having adjacent first and second members of thickness $T_1$ and $T_2$, respectively, the first and second members spaced apart by a gap of width $W_1$, said tie-down anchor comprising:
    a shaft assembly, the shaft assembly comprising (a) a longitudinally extending rod having a first end and a second end, (b) an anchor portion located at said first end, said anchor portion having a bar portion sized and shaped for engaging a lower side of at least the first member, and (c) an attachment portion located at said second end, said first end of said longitudinally extending rod and said anchor portion each having a maximum width less than or about equal to gap width $W_1$;
    a spring assembly, said spring assembly comprising (a) a compression spring, (b) an upper spring retainer, and (c) a lower spring retainer, said upper spring retainer comprising a first inner edge defining a first shaft receiving aperture, and said lower spring retainer comprising a second inner edge defining a second shaft receiving aperture, said spring assembly longitudinally adjustable and located around said longitudinally extending rod and located between said anchor portion and said attachment portion, said lower spring retainer comprising a bottom surface for engaging an upper side of at least said first member;
    wherein (1) said compression spring, (2) said upper spring retainer, and (3) said lower spring retainer are each adjustable, longitudinally alone said longitudinally extending rod; and
    wherein by engaging said lower spring retainer with the upper side of at least the first member and compressing said compression spring, the bar portion of the anchor portion may be pushed below the first member, and then the shaft assembly (a) rotated, and (b) released, so that said tie-down anchor is placed in an installed configuration where it securely engages at least the first member, by and between (1) the bar portion at the lower side, and (2) the lower spring retainer at the upper side.

2. The tie-down anchor of claim 1, wherein said bar portion is oriented radially in at least one direction, at least in part, from said longitudinally extending rod.

3. The tie-down anchor of claim 2, wherein said bar portion is oriented at least in part substantially perpendicular to said longitudinally extending rod.

4. The tie-down anchor of claim 1, wherein said bar portion is oriented radially in at least two directions, at least in part, with respect to said longitudinally extending rod.

5. The tie-down anchor of claim 4, wherein said bar portion is oriented at least in part substantially perpendicular to said longitudinally extending rod.

6. The tie-down anchor of claim 5, wherein said anchor portion further comprises downwardly oriented first and second segments joined at a vertex, and wherein at least one of said first or second segments extend from said bar portion; and where said first and second segments and at least one of said bar portions form an anchor portion.

7. The tie-down anchor of claim 6, wherein said first and second segments joined at said vertex provide, together with said bar portion, a downwardly oriented triangularly shaped anchor portion, wherein said triangularly shaped anchor portion is adapted for penetrating the gap between the first member and the second member.

8. The tie-down anchor of claim 1, wherein said attachment portion comprises a hook shaped portion having a hook base and a hook distal end.

9. The tie-down anchor of claim 8, wherein a hook gap of width $G_H$ is provided between said hook distal end and said hook base, and wherein the hook gap of width $G_H$ is adapted to accept therethrough a fastening element having an outside dimension D less than or equal to width $G_H$ of said hook gap.

10. The tie-down anchor of claim 9, wherein said upper spring retainer further comprises a spring capture side and a hook capture side, and wherein said hook capture side is sized and shaped to close the hook gap between said hook distal end and said hook base, when said tie-down is in an installed configuration.

11. The tie-down anchor of claim 10, wherein said hook capture side of said upper spring retainer comprises an inwardly dished head.

12. The tie-down anchor of claim 1, wherein said spring comprises an upper end, and wherein said upper spring retainer further comprises a spring capture side and a hook capture side, and wherein said spring capture side further comprises a vertically downwardly extending annular lip sized and shaped to capture said upper end of said spring against said spring capture side of said vertically extending annular lip.

13. The tie-down anchor of claim 1, wherein said lower spring retainer further comprises an upwardly and inwardly dished head having a sloping upper surface extending outwardly and downwardly from said second inner edge that defines said second shaft receiving aperture.

14. The tie-down anchor of claim 1, wherein said spring comprises a lower end, and wherein said lower spring retainer further comprises a spring capture side, and wherein said spring capture side further comprises a vertically upward extending annular lip sized and shaped to capture said lower end of said spring against vertically upward extending annular lip.

15. The tie-down anchor of claim 1, wherein said longitudinally extending rod comprises, at least in part, a cylindrically shaped outer surface.

16. The tie-down anchor of claim 1, wherein said bar portion comprises, at least in part, a cylindrically shaped outer surface.

17. The tie-down anchor of claim 8, wherein said attachment portion comprises, at least in part, a cylindrically shaped outer surface.

18. The tie-down anchor of claim 1, wherein said longitudinally extending rod comprises a cylindrical solid.

19. The tie-down anchor as set forth in claim 1, wherein (a) said longitudinally extending rod, (b) said anchor portion, and (c) said attachment portion, are together rotatably adjustable with respect to (d) said compression spring, (e) said upper spring retainer, and (f) said lower spring retainer of said spring assembly.

20. The tie-down anchor as set forth in claim 1, wherein said shaft assembly is axially adjustable with respect to (a) said compression spring, (b) said upper spring retainer, and (c) said lower spring retainer of said spring assembly.

21. A tie-down anchor for securing an object to a deck, the deck having first and second members of thickness $T_1$ and $T_2$, respectively, the first and second members spaced apart by a gap of width $W_1$, said tie-down anchor comprising:
 a shaft assembly, the shaft assembly comprising
  (a) a longitudinally extending rod having a first end and a second end,
  (b) an anchor portion located at said first end, said anchor portion having a bar portion sized and shaped for engaging a lower side of at least the first member, wherein the bar portion is oriented at least in part substantially perpendicular to the longitudinally extending rod, and wherein the anchor portion further comprises downwardly oriented first and second segments, at least one of which extends from said bar portion, and wherein the first and second segments are joined at a vertex to provide, together with said bar portion, a downwardly oriented triangularly shaped anchor portion, wherein said downwardly oriented triangularly shaped anchor portion is adapted for penetrating the gap between the first member and the second member, and
  (c) an attachment portion located at said second end, said first end of said longitudinally extending rod and said anchor portion each having a maximum width less than or about equal to gap width $W_1$, said attachment portion comprising a hook shaped portion having a hook base and a hook distal end, and wherein a hook gap of width $G_H$ is provided between said hook distal end and said hook base;
 a spring assembly, said spring assembly comprising (a) a compression spring, (b) an upper spring retainer, and (c) a lower spring retainer, said upper spring retainer comprising a first inner edge defining a first shaft receiving aperture, and said lower spring retainer comprising a second inner edge defining a second shaft receiving aperture, said spring assembly longitudinally adjustable and located around said longitudinally extending rod and located between said anchor portion and said attachment portion, said lower spring retainer comprising a bottom surface for engaging an upper side of at least said first member, and said upper spring retainer comprising an upper surface sized and shaped for secure mating engagement with lower portions of said attachment portion, wherein said upper spring retainer further comprises a spring capture side and a hook capture side, and wherein said hook capture side is sized and shaped to close the gap between said hook distal end and said hook base when said tie-down is in an installed configuration, and wherein said hook capture side of said upper spring retainer comprises an inwardly dished head; and
 wherein said shaft assembly is rotatably and axially adjustable with respect to said spring assembly, so that by engaging said lower spring retainer with the upper side of at least the first member and compressing said compression spring, the bar portion of the anchor portion may be pushed below the first member, and then the shaft assembly (a) rotated, and (b) released, so that said tie-down anchor is placed in an installed configuration where it securely engages at least the first member, by and between (1) the bar portion at the lower side, and (2) the lower spring retainer at the upper side.

22. A method for anchoring an object to plank deck having at least two planks and a gap therebetween, each of the two planks having an upper side and a lower side, the method comprising:
 (a) providing a tie-down anchor as set forth in claim 1, wherein said anchor portion further comprises downwardly oriented first and second segments, at least one of which extends from said bar portion, and wherein said first and second segments are joined at a vertex to provide, together with said bar portion, a downwardly oriented triangularly shaped anchor portion, wherein said triangularly shaped anchor portion is adapted for penetrating said gap between said at least two planks of said plank deck;
 (b) placing the tie-down anchor in juxtaposition with the plank deck so that the anchor end aligns with a gap between two deck planks;
 (c) inserting the anchor portion and at least some of the longitudinally extending rod through the gap between the two deck planks until the bar portions are below the lower side of the two deck planks;
 (d) rotating the shaft assembly about its longitudinal axis until at least one of the bar portions is oriented from about forty five degrees (45°) to about ninety degrees (90°) relative to the gap; and
 (e) releasing the tie-down axially while keeping the tie-down in place laterally, so that the deck planks are firmly secured between the bar and the bottom surface of the lower spring retainer.

23. A method as set forth in claim 22, further comprising the steps of:
 (f) providing an attachment portion comprising a hook shaped portion having a hook base and a hook distal end, wherein a hook gap of width $G_H$ is provided between said hook distal end and said hook base;
 (g) compressing said upper spring retainer against said compression spring to expose said hook gap;
 (h) inserting through said hook gap a fastening element having an outside dimension D less than or equal to width $G_H$ of said hook gap; and
 (i) releasing said upper spring retainer, so that said upper spring retainer closes the hook gap, so as to securely retain the fastening element in the attachment portion.

24. A method as set forth in claim 23, wherein said tie-down anchor is sized and shaped for manual installation to and removal from said plank deck without the use of tools.

* * * * *

UNITED STATES PATENT AND TRADEMARK OFFICE
CERTIFICATE OF CORRECTION

PATENT NO. : 10,598,202 B2  
APPLICATION NO. : 15/226782  
DATED : March 24, 2020  
INVENTOR(S) : Richard D. Welch Page 1 of 1

It is certified that error appears in the above-identified patent and that said Letters Patent is hereby corrected as shown below:

In the Specification

Column 3, Line 12, after the words "passage therethrough of", delete "an" and substitute therefore --a--.

Column 4, Line 64, after the words "the materials of", delete "constructions" and substitute therefore --construction--.

Column 7, Line 19, after the word "fastening", delete "elements" and substitute therefore --element--.

Column 7, Line 26, after the words "dished head 74 in a", delete "shaped" and substitute therefore --shape--.

Column 7, Line 67, after the words "the first member 26", insert --and--.

In the Claims

Column 10, Line 11, in Claim 6, after the word "and", delete "where" and substitute therefore --wherein--.

Signed and Sealed this  
Thirteenth Day of October, 2020

Andrei Iancu  
*Director of the United States Patent and Trademark Office*